(12) United States Patent
Gamberini et al.

(10) Patent No.: US 11,883,830 B2
(45) Date of Patent: Jan. 30, 2024

(54) SORTING SYSTEM

(71) Applicant: WEBSPHERE IT & SOFT SOLUTIONS SRL, Bucharest (RO)

(72) Inventors: Maria Giovanna Gamberini, Ferrara (IT); Giovanni Rolfini, Padua (IT)

(73) Assignee: WEBSPHERE IT & SOFT SOLUTIONS SRL, Buchare (RO)

( * ) Notice: Subject to any disclaimer, the term of this patent is extended or adjusted under 35 U.S.C. 154(b) by 52 days.

(21) Appl. No.: 17/630,688

(22) PCT Filed: Jul. 29, 2020

(86) PCT No.: PCT/IB2020/057137
§ 371 (c)(1),
(2) Date: Jan. 27, 2022

(87) PCT Pub. No.: WO2021/019451
PCT Pub. Date: Feb. 4, 2021

(65) Prior Publication Data
US 2022/0258175 A1 Aug. 18, 2022

(30) Foreign Application Priority Data
Jul. 30, 2019 (IT) .......................... 102019000013347

(51) Int. Cl.
*B03B 9/06* (2006.01)
*B29B 17/02* (2006.01)
*B03B 11/00* (2006.01)

(52) U.S. Cl.
CPC .............. *B03B 9/061* (2013.01); *B29B 17/02* (2013.01); *B03B 2011/006* (2013.01); *B07B 2220/02* (2013.01); *B07B 2230/01* (2013.01)

(58) Field of Classification Search
CPC ... B03B 9/061; B03B 2011/006; B03B 11/00; B03B 5/36; B03B 2011/008; B03B 9/06;
(Continued)

(56) References Cited

U.S. PATENT DOCUMENTS

| 2,734,629 A | * | 2/1956 | Menzies | .................. B03B 5/36 |
| | | | | 209/172.5 |
| 4,073,661 A | * | 2/1978 | Buzga | ....................... B03B 5/54 |
| | | | | 134/19 |

(Continued)

FOREIGN PATENT DOCUMENTS

| CN | 105728173 A | * | 7/2016 |
| CN | 106273070 B | * | 2/2019 |

(Continued)

OTHER PUBLICATIONS

International Search Report and Written Opinion Received for the PCT Application No. PCT/IB2020/057137, dated Nov. 23, 2020, 10 pages.

*Primary Examiner* — Gene O Crawford
*Assistant Examiner* — Muhammad Awais
(74) *Attorney, Agent, or Firm* — Leason Ellis LLP

(57) ABSTRACT

A waste sorting system (1) comprising a tank (S) for collecting recyclable material (RM) and a sorting unit (U) comprising a first sorting station (10) connected to the tank (S) through a transport device (12) of the recyclable material and a first sorting basin (14) containing a first liquid solution (L1) of given density to separate, according to Archimedes' principle, the recyclable material (RM) into a first material phase (F1) of first selection and a second material phase (F2) of first submersion; the first sorting basin (14) is delimited at the bottom by a first lower collection portion (140), the sorting unit (U) comprising first scraper means (16) associated with the first sorting basin (14) for collecting the first phase (F1) from a free surface of the first liquid solution (L1) and first wash means (18) of this first phase (F1); the first lower collection portion (140) being passed through by a first conveyor (11).

13 Claims, 1 Drawing Sheet

(58) Field of Classification Search
CPC .... B03B 7/00; B03B 5/28; B03B 5/30; B03B 5/447; B29B 17/02; B29B 2017/0244; B07B 2220/02; B07B 2230/01; Y02W 30/52; B08B 3/04; B08B 3/08
USPC .......................................................... 209/3
See application file for complete search history.

(56) References Cited

U.S. PATENT DOCUMENTS

| | | | |
|---|---|---|---|
| 6,644,572 B1 * | 11/2003 | Cases ...................... | B29B 17/02 241/76 |
| 2002/0153285 A1 * | 10/2002 | Arakane ................. | B29B 17/02 209/3 |
| 2003/0141225 A1 * | 7/2003 | Liddle ..................... | B29B 17/02 209/172 |
| 2005/0274651 A1 * | 12/2005 | Daniels ................. | B01D 21/02 209/162 |
| 2015/0251191 A1 * | 9/2015 | Flores ...................... | B03B 5/30 209/172 |
| 2019/0321831 A1 * | 10/2019 | Previero ................... | B03B 5/02 |

FOREIGN PATENT DOCUMENTS

| | | | | |
|---|---|---|---|---|
| CN | 106273070 B | | 2/2019 | |
| DE | 4023434 A1 | * | 1/1992 | |
| DE | 4130645 A1 | * | 3/1993 | ............... B03B 5/28 |
| DE | 4217464 A1 | * | 12/1993 | ............. B03B 11/00 |
| DE | 102014220330 A1 | * | 4/2016 | |
| EP | 0980712 A1 | * | 2/2000 | |
| FR | 2619025 A1 | * | 2/1989 | |
| IT | MI20101870 A1 | | 4/2012 | |
| KR | 101459345 B1 | * | 11/2014 | |
| KR | 20160056152 A | * | 5/2016 | |
| KR | 101638182 B1 | * | 7/2016 | |
| KR | 20190074706 A | * | 6/2019 | |
| WO | WO-9407671 A1 | * | 4/1994 | ............... B03B 5/28 |
| WO | WO-2011007837 A1 | * | 1/2011 | ........... B03D 1/1418 |

\* cited by examiner

SORTING SYSTEM

CROSS-REFERENCE TO RELATED APPLICATIONS

This application claims benefit under 35 U.S.C. § 371 to international application no. PCT/IB20201057137, filed on Jul. 29, 2020, which claims priority to Italian application no. 102019000013347, filed Jul. 30, 2019, the contents of which are incorporated by reference in their entireties.

The present invention relates to a waste sorting system. In particular, the present invention relates to a waste sorting system arranged to separate substances upstream of a recycling station. More in detail, the present invention refers to a waste sorting system arranged to separate substances upstream of a recycling station for inert materials and plastics.

DESCRIPTION OF THE STATE OF THE ART

In the waste recycling sector, sorting waste into macro-groups based on its nature has been known for some time. With reference to industrial waste, paper, cardboard, plastics, metals are easily separated, but it should be considered that for effective recycling, simple separation into macro-groups is not enough. By way of non-limiting example, considering plastic materials, each material has its own physical-chemical properties, which makes it particularly suitable for specific applications and requires companies specialised in its recycling. Therefore, although the problem of sorting plastics and materials of other kinds into chemically and physically homogeneous families is determining, as of the date of this document there are no known industrial sorting systems that carry out the sorting of materials of given types operating on masses of waste that have not already been separated, where sorting is carried out with limited costs and times and with minimum human intervention.

In view of above situation, it would be desirable to have a waste sorting system that, besides limiting and possibly solving the problems typical of the condition illustrated above, defines a new standard in the sector.

SUMMARY OF THE PRESENT INVENTION

The present invention relates to a waste sorting system. In particular, the present invention refers to a waste sorting system designed to separate substances upstream of a recycling station. More in detail, the present invention refers to a waste sorting system designed to separate substances upstream of a recycling station for inert materials and plastics.

The problems set forth above are solved by the present invention according to at least one of the appended claims. According to a preferred non-limiting embodiment of the present invention, there is provided a waste sorting system comprising a tank for collecting recyclable material and a sorting unit comprising a first sorting station connected to said tank through a transport device of said recyclable material and a first sorting basin containing a first liquid solution of given density to separate, according to Archimedes' principle, said recyclable material into a first material phase of first selection and a second material phase of first submersion; said first sorting basin is delimited at the bottom by a first lower collection portion; said sorting unit comprises first scraper means associated with said first sorting basin for collecting said first phase from a free surface of said first liquid solution and first wash means of said first phase; said first lower collection portion being passed through by a first conveyor.

BRIEF DESCRIPTION OF THE FIGURE

Further features and advantages of the sorting system according to the present invention will be more apparent from the following description, set forth with reference to the accompanying figures illustrating some non-limiting examples of embodiment thereof, in which identical or corresponding parts of the device are identified by the same reference numbers. In particular.

DETAILED DESCRIPTION OF THE PRESENT INVENTION

Figure 1:
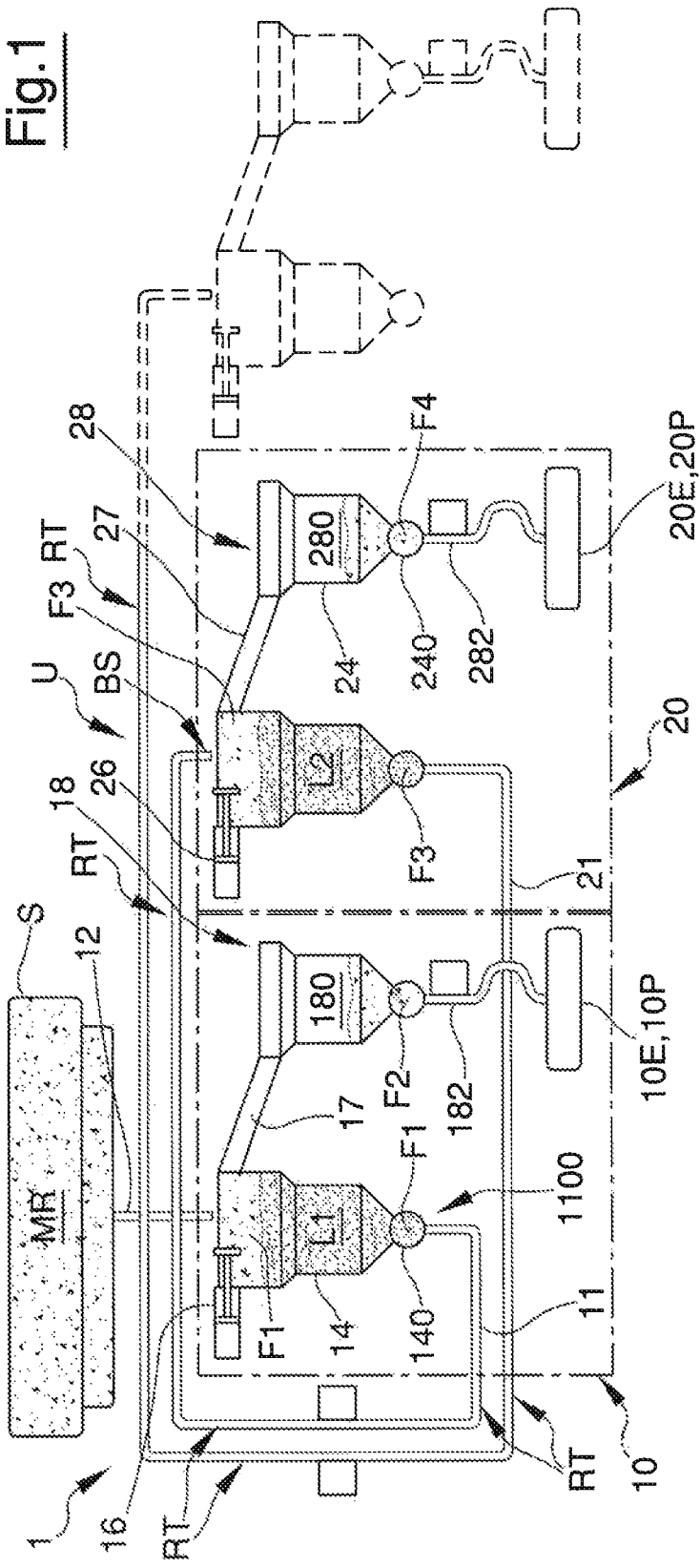
FIG. 1 is a schematic view of a system according to the present invention.

In FIG. 1, the reference number 1 indicates, as a whole, a waste sorting system 1 comprising a tank S for collecting recyclable material RM and a sorting unit U comprising a first sorting station 10. This first station 10 is connected to said tank S through a transport device 12 arranged to feed, in use, recyclable material and a first sorting basin 14 containing a first liquid solution L1. This solution L1 has given density in order to separate the recyclable material RM into a first phase F1 containing material that remains on the surface, according to Archimedes' principle, and that here and hereinafter will be defined as "material of first selection", and into a second phase F2 containing the material that precipitates to the bottom of the first basin 14 and that here and hereinafter will be defined as "material of first submersion". The first sorting basin 14 is delimited at the bottom by a first lower collection portion 140 arranged to collect the material phase 1 of first submersion. Moreover, the sorting unit U comprises first scraper members 16 associated with the first sorting basin 14, schematized in FIG. 1 with a scraper operated by a linear actuator, the purpose of which is to transfer the first phase F1 from a free surface of the first liquid solution L1 of the first basin 14 to a first wash device 18 through a transfer channel 17 in which this first phase F1 is purified by the first solution L1. It may be useful to specify that that first lower collection portion 140 is passed through by a first conveyor 11.

Figure 2:
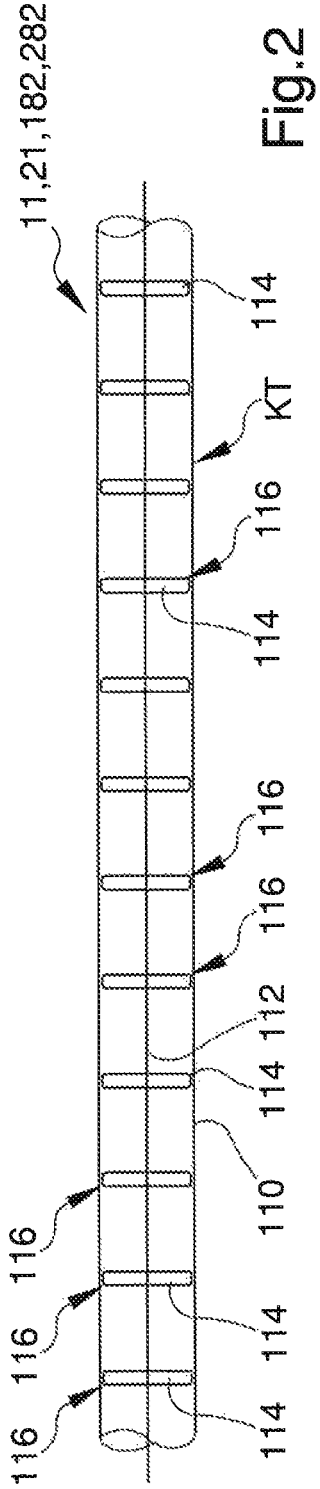
FIG. 2 is a longitudinal sectional view in an enlarged scale of a detail of FIG. 1.

This first conveyor 11 comprises a first tubular transport channel 110 provided with respective first transport branches RT and at least one discharge outlet BS through which a first flexible member 112 that engages the first channel 110 passes and comprises a plurality of discs 114. As can be seen in FIG. 2, these discs engage in steps, transversally and to size, the first channel 110 identifying a plurality of transport chambers 116, each of which is delimited axially by two discs 114. Naturally, the first conveyor comprises an actuator member 118, which is associated with the first channel 110 in any position in order to advance the discs 114 along the first channel 110 interacting with the flexible member 112. The first channel 110 further comprises a first pick-up station 1100 that passes through the first lower collection portion 140. Again with reference to FIG. 1, the first wash device 18 comprises a first wash basin 180 that contains water or a wash liquid.

The first station 10 further comprises a first drying device 10E and/or a first packaging device 10P located downstream and connected to the first wash means 18 by a second conveyor 182 similar to the first. To simplify the drawing, the first drying device 10E and the first packaging device 10P have been illustrated as coincident, even if, as one might imagine, in actual fact these are two physically distinct devices.

The sorting unit U further comprises a second sorting station 20, which in turn comprises a second sorting basin 24 connected to the first lower portion 140 through the first conveyor 11. This second sorting basin 24 contains a second liquid solution L2, the density of which is given and greater than the density of the first liquid solution L1 in order to separate the first phase F1 into a third material phase F3 of second selection and a fourth material phase F4 of second submersion, according to Archimedes' principle. The sorting unit U further comprises second scraper members 26 associated with the second sorting basin 24 to transfer the third phase F3 from a free surface of the second liquid solution L1 to a second wash device 28 through a transfer channel 27, in which the third phase F3 is purified by the second liquid solution L2.

The second station 20 further comprises a second drying device 20E and/or a second packaging device 20P positioned downstream and connected to the second wash means 28. Also in this case, for the sake of simplicity in the drawing the second drying device 20E and the second packaging device 20P are illustrated as coincident even if, as one might imagine, in actual fact these are two physically distinct devices.

Again with reference to FIG. 1, the second sorting basin 24 is delimited at the bottom by a first lower collection portion 240 that, in the same way as the first basin 14, is passed through by a third conveyor 21 of the same type as the first conveyor 11, and therefore the description is omitted for brevity in the text and figures.

Moreover, the second wash device 28 comprises a second wash basin 280 containing water or a wash liquid and connected to the second drying device 20E and/or to the second packaging device 20P through a fourth conveyor 282 of the same type as the second conveyor 182.

It may be useful to specify that the first conveyor 11, the second conveyor 182, the third conveyor 21 and the fourth conveyor 282 are of the same type described above. Use of the system illustrated above is easily understood from the foregoing description and does not required further explanation. Moreover, it may be of use to specify that the aforesaid process for sorting submerged material phases of different and increasing specific mass from recyclable material MR can be carried out with any number of sorting stations, where each sorting station will comprise a sorting basin containing a liquid solution of given and gradually increasing density for each further sorting station. Therefore, the decision to describe and illustrate the system 1 with only two sorting stations has the sole purpose of schematically describing a simplified modular system in which the recyclable material MR can be separated into a plurality of phases $F_1 \ldots F_n$ of different density, the number "n" of which can be defined based on specific needs, as can the number "n" of phases contained in the recyclable material MR fed to the sorting basins from the tank S.

Moreover, it may be of use to specify that in order to facilitate the wettability of the bodies submerged in the sorting basins 14 and 24 of the system 1, hence to improve the tendency to sink of the materials to be sorted in the liquid solutions (indicated as L1 and L2 in the embodiment described above) under the action of gravity and without the interference of gas microbubbles, typically air, adhering to these bodies, surfactants can be added thereto. Moreover, antifouling products can be used to prevent the development of phenomena of fermentation and the consequent formation of gases and unpleasant odours.

In actual fact, these products (surfactants and antifouling agents) can also be added to the water or to the wash liquids contained in the first wash basin 180 and in the second wash basin 280. In the case in which running water is used for washing, the addition of these products is superfluous.

Finally, it is clear that the system described and illustrated herein can undergo modifications and variants without departing from the scope of protection of the present invention.

Based on the description above, it is easily understood that the system 1 is suitable to solve the problems of the state of the art illustrated above.

The invention claimed is:

1. A waste sorting system (1) comprising a tank (S) for collecting recyclable material (RM) and a sorting unit (U) comprising a first sorting station (10) connected to said tank (S) through a transport device (12 of said recyclable material and a first sorting basin (14) containing a first liquid solution (L1) of given density to separate, according to Archimedes' principle, said recyclable material (RM) into a first material phase (F1) of first selection and a second material phase (F2) of first submersion; said first sorting basin (14) is delimited at the bottom by a first lower collection portion (140); wherein said sorting unit (U) comprises a first scraper (16) associated with said first sorting basin (14) for collecting said first phase (F1) from a free surface of said first liquid solution (L1) and first wash means (18) of said first phase (F1); said first lower collection portion (140) being passed through by a first conveyor (11); said first scraper moving axially within the first sorting basin for transferring said first phase (F1).

2. The system according to claim 1, wherein said first wash means (18) comprise a first wash basin (180) containing water or a wash liquid.

3. The system according to claim 1, wherein said first station (10) comprises a first drying device (10E) and/or a first packaging device (10P) located downstream and connected to said first wash means (18) by a second conveyor (182).

4. The system according to claim 1, wherein said first conveyor (11) comprises a first tubular transport channel (110) provided with respective first transport branches (RT) and at least one discharge outlet (BS) through which a first flexible member (112) that engages said first channel (110) passes and comprising a plurality of discs (114) that engage in steps, transversally and to size said first channel (110) identifying a plurality of transport chambers (116), each being delimited axially by two said discs (114); an actuator member (118) being associated with said first channel (110) to advance said discs (114) along said first channel (110) through said flexible member (112); said first channel (110) comprising, a first pick-up station (1100) that passes through said first lower collection portion (140).

5. The system according to claim 1, wherein said sorting unit (U) comprises a second sorting station (20) comprising a second sorting basin (24) connected to said first lower portion (140) through said first conveyor (11) and containing a second liquid solution (L2) of given density to separate, according to Archimedes' principle, said first phase (F1) into a third material phase (F3) of second selection and a fourth material phase (F4) of second submersion; said sorting unit (U) comprising a second scraper (26) associated with said second sorting basin (24) to collect said third phase (F3)

from a free surface of said second liquid solution (L1) and second wash means (28) of said third phase (F3).

6. The system according to claim 5, wherein said second station (20) comprises a second drying device (20E) and/or a second packaging device (20P) positioned downstream and connected to said second wash means (28).

7. The system according to claim 6, wherein said second sorting basin (24) is delimited at the bottom by a second lower collection portion (240); said second lower collection portion (240) being passed through by a third conveyor (21) of the same type as said first conveyor (11).

8. The system according to claim 6, wherein said second wash means (28) comprise a second wash basin (280) containing water or a wash liquid and connected to said second drying device (20E) and/or a second packaging device (20P) through a fourth conveyor (282) of the same type as said second conveyor (182).

9. The system according to claim 8, wherein said first conveyor (11) and second conveyor (182) are of the same type.

10. The system according to claim 5, wherein at least one between said first solution (L1), said second solution (L2) and at least one of the wash liquids contained in said first wash basin (180) and second wash basin (280) contain surfactant and/or antifouling substances.

11. A waste sorting system for sorting recyclable material comprising:
   a sorting unit including a first sorting station and a first sorting basin containing a first liquid solution of given density to separate the recyclable material into a first material phase that floats in the first sorting basin and a second material phase that is submerged in the first sorting basin of first submersion;
   a wash basin fluidly coupled to an upper portion of the first sorting basin via a first conduit;
   a conveyor coupled to a bottom portion of the first sorting basin for removal of the second material phase; and
   a first scraper positioned at the upper portion of the first sorting basin for collecting the first material phase from a free surface of the first liquid solution for transfer of the first material phase to the wash basin via the first conduit, wherein the first scraper is operated by a linear actuator and moves in a back and forth manner along the upper portion;
   wherein the first conduit is angled downward in a direction toward the wash basin to allow the first material phase to flow downhill into the wash basin.

12. The system according to claim 11, wherein the first scraper moves between retracted and extend positions in which in the retracted position, less of the first scraper is located in the upper portion.

13. The system according to claim 11, wherein the first scraper has a longitudinal axis that intersects an inlet end of the first conduit but not an outlet end of the first conduit that opens into the wash basin.

* * * * *